United States Patent Office 2,928,773
Patented Mar. 15, 1960

---

2,928,773

PROCESS FOR PREPARING INOSINE

Willibald Klein, Milan, Italy, assignor to Societa Italiana Prodotti Schering, Milan, Italy No Drawing. Application November 17, 1958
Serial No. 774,160

3 Claims. (Cl. 195—68)

This invention relates to a process for preparing inosine by the action of adenosinedesaminase on adenosine. Inosine has an excellent therapeutic activity in severe muscular heart insufficiencies not responding to heart glucosides therapy and in disturbances of cell metabolism due to ulcus cruris, purulent fistulae and burns.

The biological preparation of inosine has been already described by Klein, Methoden der Fermentforschung, Thieme, Leipsiz, 1941, vol I, page 324. According to this process, which uses the small intestine mucosa of calves, guanosine and uridine are isolated together with inosine. The yield of inosine is about 8 g. for every 100 g. of yeast nucleic acid. Later on Kalckar described the isolation of the ferment adenosinedesaminase from small intestine mucosa of calves (J. Biol. Chemistry 167, 462) and the subsequent action of the pure ferment on adenosine. According to the Kalckar process the calf intestinal mucosa is digested with trypsine for 36 hours, the mixture is then filtered, the filtrate treated with ammonium sulfate, the precipitate collected, dissolved in ammonium acetate, again precipitated by addition of ammonium sulfate, again dissolved in ammonium acetate, dialyzed overnight against ammonium acetate, the dialyzate treated with alumina suspension and centrifuged, the alumina eluted with phosphate buffer and dialyzed 24 hours against ammonium acetate. By the action of this ferment on adenosine a yield of 1.8 g. of inosine starting from 3 g. adenosine is obtained, corresponding to 60 percent of the theoretical amount.

I have now found that adenosine can be quantitatively converted into inosine by using thoroughly purified adenosinedesaminase. To this end, according to my process, the intestinal mucosa, instead of being digested with trypsine, is autolyzed at a pH between about 5.5 and about 5.8. The best results are obtained with calf intestinal mucosa, although good yields are also obtained with ox or hog intestinal mucosa and others. After removing the precipitate the solution is subjected to fractional precipitation with acetone or a lower aliphatic alchol, such as methanol or ethanol. The fractional precipitation is best carried out by adding to the solution about one half its volume of the selected organic solvent, removing by filtration the precipitate thereby formed, and adding to the filtrate a volume of the same solvent corresponding to about the same volume of the original solution. The first precipitated fraction is discarded, and the second fraction containing all of the ferment is collected and dried. This powder maintains its whole activity on storage at room temperature for at least one year. A further purification is best carried out by extracting the powder with water and again subjecting the solution to fractional precipitation with ammonium sulfate. To the aqueous solution there is then added such an amount of ammonium sulfate or of a saturated water solution of ammonium sulfate that an about 50 percent concentration of ammonium sulfate (w./v.) results. The precipitate thereby formed is discarded by filtration, and to the filtrate a further amount of ammonium sulfate is added until a concentration of approximately 70 percent of this salt (w./v.) is reached. A new precipitate forms, which contains all of the activity. The precipitate is collected, dissolved in a small amount of water and dialyzed against distilled water. From the obtained solution, previously buffered at pH 5 to 6 by the addition of alkali phosphates or acetates, the ferment is adsorbed on alumina and eluted with very diluted alkali metal citrate solution.

The eluate which is 2 to 3 times more active than the Kalckar preparation, is free from purinenucleoside phosphorylase and phosphatas. The solution stored at 0° C. maintains its whole activity for at least 4 weeks. By the action of this ferment solution on adenosine practically quantitative yields of pure inosine are obtained. To this end the ferment solution is mixed with a water solution of adenosine without any addition of buffering substances, as was necessary in formerly described procedures. The mixture is allowed to stand for a prolonged period of time preferably 12–20 hours, then it is concentrated in vacuo under reduced pressure until crystals begin to separate. After cooling at a temperature below 5° C., and preferably near 0°, the precipitate is collected and recrystallized from water with the addition of an absorbent. Of paramount importance for the yield increase is the fact that under the described conditions no buffer is used. Traces of ferment albumin are easily removed by the final recrystallization of inosine with the addition of an absorbent, such as charcoal. The mother liquor may contain trace impurities due to the employed adenosine. The following example is given only for better illustrating the invention and should not be understood as limitative.

Example

The mucosa of the first 3 metres of a freshly removed calf intestine (about 200 g.) is well scraped, mixed with 400 ml. water at 0° and homogenized. After addition of further 600 ml. of cold water, N HCl is added cautiously to pH 5.5. The abundant precipitate is centrifuged and the light yellow to brown opalescent ferment solution is slowly diluted with 500 ml. of cold acetone at −5/0° C. The precipitate is removed by filtration and the filtrate is again diluted with 1000 ml. of acetone at −10° C. This double treatment with acetone should require not more than 1 hour. The second precipitate is collected, washed with acetone and with a mixture acetone-ethyl ether 1:1 and dried in vacuo in a desiccator.

The dry substance (about 2 g.) is shaken for 15 minutes with 400 ml. of water at 22° and centrifuged. The supernatant liquid (about 300 ml.) is diluted with an equal volume of saturated ammonium sulfate solution of pH 7.7 and the formed precipitate is contrifuged. To the solution 132 g. of solid ammonium sulfate is added. The precipitate thereby obtained contains the ferment. This is collected, washed with 70 percent water solution of ammonium sulfate, dissolved in 40 ml. of water and dialyzed overnight through cellophane against distilled water at 0° C.

The dialyzate (40 ml.) is treated with 8 ml. N phosphate buffer at pH 5.7, diluted to 700 ml. with water at 0° C. and absorbed on alumina. After washing with 80 ml. water the alumina is eluted first with 80 ml., then with 40 ml. of a 0.01 M sodium citrate solution (pH 8.5).

To a solution of 100 g. of adenosine in 7500 ml. of water 50 ml. of the above eluate are added. After 15 hours storage the mixture is concentrated in vacuo until inosine begins to crystallize. Once the precipitation is complete, i.e. after some hours at 0° C., the precipitate is collected and recrystallized from 1000 ml. water with the addition of some charcoal. The mother liquors on concentration give additional product. The overall yield is about 95% on the starting adenosine. The obtained inosine is pure and free from the traces of adenosine.

I claim:

1. A process for preparing pure inosine, which comprises adding hydrochloric acid to a homogeneous water suspension of intestinal mucosa to pH from about 5.5 to about 5.8, centrifuging the acidic suspension, diluting the supernatant solution, after centrifugation, first with about one-half its volume, then with about an equal volume of an organic solvent of the class consisting of lower aliphatic alcohols and acetone, discarding the precipitate formed after the first organic solvent addition, collecting the precipitate formed after the second organic solvent addition, drying said precipitate and extracting it with water, adjusting the aqueous extract to pH from about 7.0 to about 8.0 adding ammonium sulfate first to a concentration of about 50 percent, then to a concentration of about 70 percent, discarding the precipitate formed after the first addition of ammonium sulfate, collecting the precipitate formed after the second addition of ammonium sulfate, dialyzing said precipitate against water, adjusting the dialyzed solution to pH between 5.0 and 6.0 by the addition of a buffering agent of the class consisting of alkali acetates, alkali phosphates and their mixtures, absorbing the ferment from the buffered solution on alumina, eluting said ferment with about 0.01 M alkali metal citrate solution, mixing the eluate without buffer addition with an aqueous adenosine solution, concentrating after 12–20 hours the mixture in vacuo to incipient crystallization, collecting the precipitate at a temperature below about 5° C. and recrystallizing it from water with the addition of an adsorbent.

2. A process as described in claim 1, wherein the intestinal mucosa is calf intestinal mucosa.

3. A process as described in claim 1, wherein the centrifuged acid suspension obtained from the homogeneous water suspension of intestinal mucosa is diluted with acetone.

No references cited.